United States Patent

[11] 3,572,812

| [72] | Inventor | John Norcia<br>R.F.D.4 Box 451, North Brunswick, N.J. 08902 |
|---|---|---|
| [21] | Appl. No. | 779,969 |
| [22] | Filed | Nov. 29, 1968 |
| [45] | Patented | Mar. 30, 1971 |

[54] RETRACTABLE SIDEBOARDS
8 Claims, 11 Drawing Figs.

[52] U.S. Cl. .................................................. 296/26, 52/67
[51] Int. Cl. ...................................................... B62d 33/08
[50] Field of Search.......................................... 296/10, 26, 36; 52/67

[56] References Cited
UNITED STATES PATENTS

| 3,198,571 | 8/1965 | Majeski...................... | 296/26 |
| 2,992,038 | 7/1961 | Manganello................. | 296/36 |
| 2,879,103 | 3/1959 | Hall............................ | 296/23.3 |

*Primary Examiner*—Philip Goodman
*Attorneys*—Arthur L. Plevy and Plevy & Spivak

ABSTRACT: A truck, having a boxlike load accommodating structure, has mounted on each of the sides of the structure near the top surfaces thereof, a retractable sideboard assembly. The sideboard assembly has an inner member secured to the top of the sides of the box structure. The inner member contains piston units for vertically moving a second cover member slideably mounted over said first member. The pistons within said piston units are activated from a valve controlled energy source, such as a pneumatic or hydraulic unit, and serve to raise the second members, which effectively increases the height of the truck sides, protects the load and the operator, without substantially decreasing the effective legal payload of the vehicle.

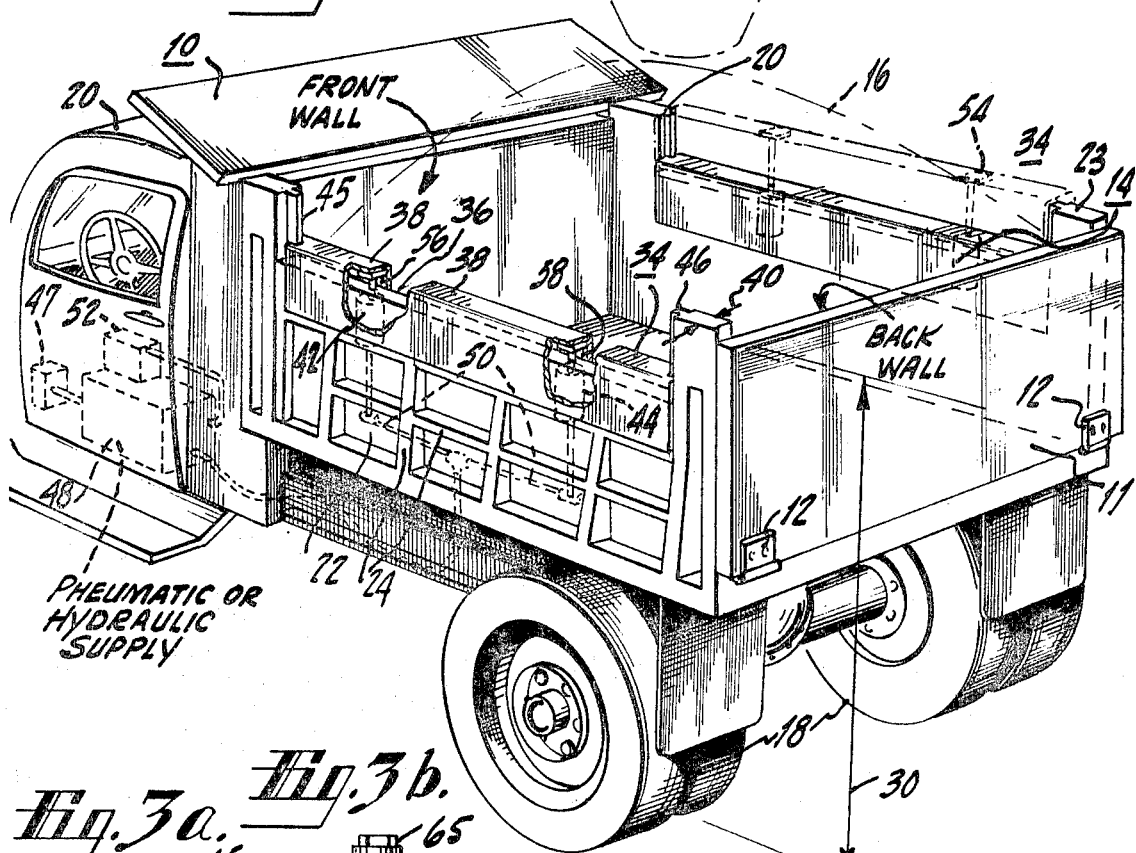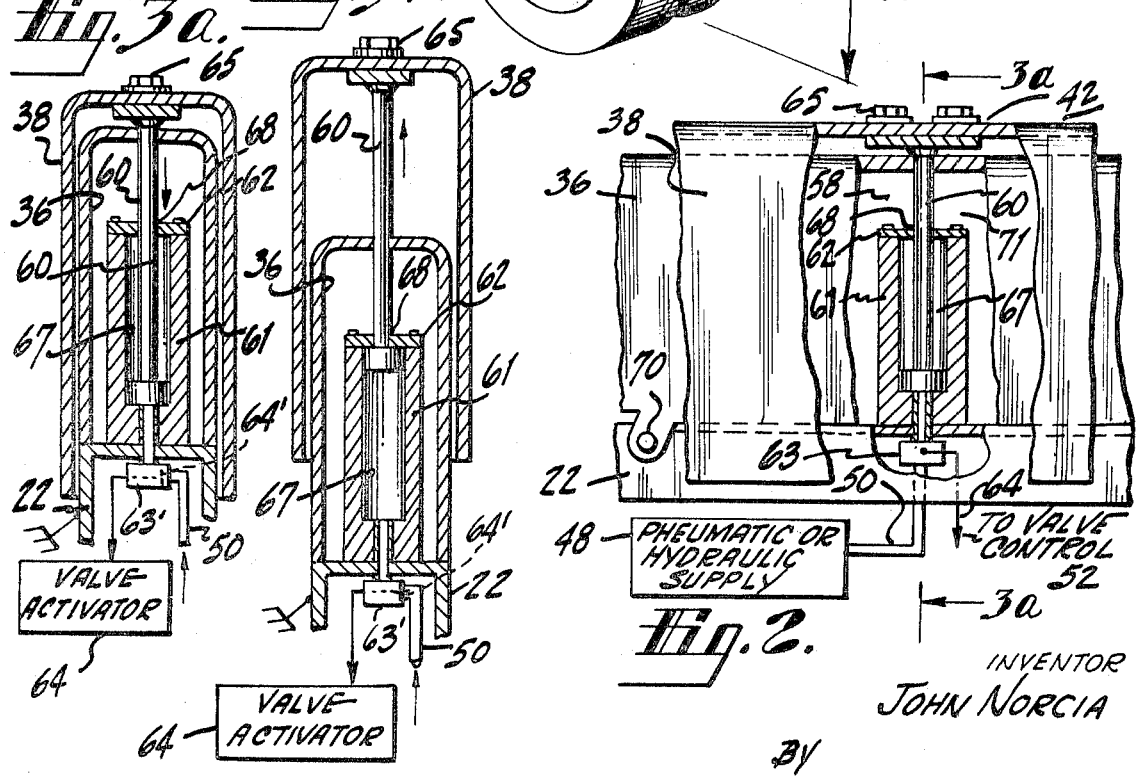

INVENTOR
JOHN NORCIA
BY
ATTORNEY

RETRACTABLE SIDEBOARDS

The present invention relates, in general, to improvements in vehicle bodies and, more particularly, to improvements in the adaptation and operation of truck bodies especially designed for the transportation and delivery of bulk materials.

There presently exist a variety of vehicles or trucks which primarily serve to transport bulk cargo, such as stone, sand, earth and so on. Such vehicles are referred to in the art as excavator-type trucks or more commonly as dump trucks.

A dump truck basically comprises a boxlike load accommodating section or structure mounted on a suitable truck frame assembly having wheels, a cab and the typical drive mechanisms common to any such vehicle. The load accommodating box is pivotally mounted on the frame and can, in combination, with a suitable underbody or front mounted hoist be moved with respect to the frame about such a pivot point; and in this manner can discharge or dump any of the above material loads.

Presently, such truck bodies or load assemblies are available as separate units and accordingly can be conveniently mounted on a suitable truck frame or drive assembly.

Design considerations concerning utility of such load accommodating boxes or bodies, dictate desired cubic capacity of the box load, which in turn, defines the legal payload. Legal payload or statutory carrying capacity of such vehicles is determined by Federal and state regulations for the protection of roads and, in general, of the public.

In order to economically operate such vehicles it is then desired to carry the legal payload according to the cubic capacity of the boxlike structure.

Due to the nature of the cargo, such dump trucks are typically top loaded. That is, by means of earth scooping devices as steam shovels, derricks or hoppers, the cargo is placed into the box load from the top opening.

Generally the apparatus which serves to top load a dump truck can rarely deposit the legal payload in a uniform manner or with an equal distribution. A device as a hopper deposits the payload in the form of a mound or a pyramid. If the load is uniformly dispersed it would fit within the bounds of the boxlike structure and not protrude from the top or above the tops of the sides of the box structure. However, a mound of cargo having a tapered configuration does so protrude.

Therefore the operator of the dump vehicle or others workers, usually climb up the side of the dump truck into the cargo accommodating area and with the aid of a shovel or other device redistribute the load.

In the above process many men have fallen from the sides or top of the truck or have been injured by disturbing the load which has toppled on them, and so on. Such accidents are frequent and costly, both to the employer and, of course, the injured party. Due to the dangers involved many operators of such dump trucks being justly fearful of climbing up the side of the trucks to redistribute a precarious balanced load, ignore the distribution and proceed with delivery. In this manner the load during such transportation will slide and spill over the sides of the boxlike assembly. The dangers involved are apparent, and can result in damage to other vehicles utilizing the same highway, to the highway itself and so on. This can therefore occur even though the legal payload limitations are not exceeded. Accordingly, other regulations dictate the covering of such protruding loads, within legal limits, by a suitable tarpaulin or other material to prevent the load from spilling onto the roadway.

In order to secure such a tarpaulin the operator has to again climb the sides of the truck to properly fasten the covering and therefore is subjected to similar dangers as those involved in redistributing the load.

It is therefore an object of the present invention to provide improved apparatus in the form of automatically retractable sideboards for a dump truck or suitable vehicle.

A further object is to provide improved apparatus, adaptable for mounting on any conventional type of dump truck, having a boxlike load, carrying assembly for preventing spillage of bulk cargo onto the roadway, which thereby results in protection of the public in general.

These and other objects of the invention are accomplished in one embodiment by retractable sideboards comprising first and second members. Both members are dimensioned in length approximately equal to the length of one of the sides of the boxlike load accommodating structure of the dump vehicle. The first member is rigidly mounted near the top surface of a side of the load supporting structure and contains within a hollow recess a force exerting assembly.

The assembly, which may be a piston, is activated by means of a hydraulic, pneumatic or other prime source capable of transferring energy either under pressure or via suitable conductors, in the case of electricity. The force exerting assembly has a moveable pistonlike member which moves in a relatively vertical direction, with respect to said first member, upon application thereto of said prime source. The piston is caused to engage said second member, which is slidably mounted with respect to said first member, to move said second member relatively vertically with respect to the sides of the boxlike load accommodating structure.

The movement and consequent positioning of the second member serves to effectively increase the height of the sides of the box structure to tend to prevent the bulk cargo from spilling over the sides during transport.

The sideboards, as above, can be activated by means of a remotely controlled valve which serves to couple the prime source to the force exerting assembly. The valve is preferably controlled by a suitable switch mechanism located in the cab assembly of the dump vehicle and hence permits the operator to safely confine the cargo without the necessity of climbing up the side of the truck for purposes of redistributing the load or to cover the same, as described above.

The various features of the invention which are believed to be novel are set forth with particularity in the appended claims. The invention, together with further objects and advantages thereof, may be best understood by reference to the accompanying drawing in which:

FIG. 1 is a perspective view of an excavator or dump-type truck embodying retractable sideboards, shown partly in broken section, according to this invention.

FIG. 2 is a broken sectional perspective view of a piston assembly located within a retractable sideboard configuration similar to that shown in FIG. 1.

FIG. 3A is a cross-sectional, side view of FIG. 2 taken through line 3-3, showing a sideboard assembly in a retractable position.

FIG. 3B is the same cross-sectional view as FIG. 3A showing the sideboards in a revised position.

Figure 4:
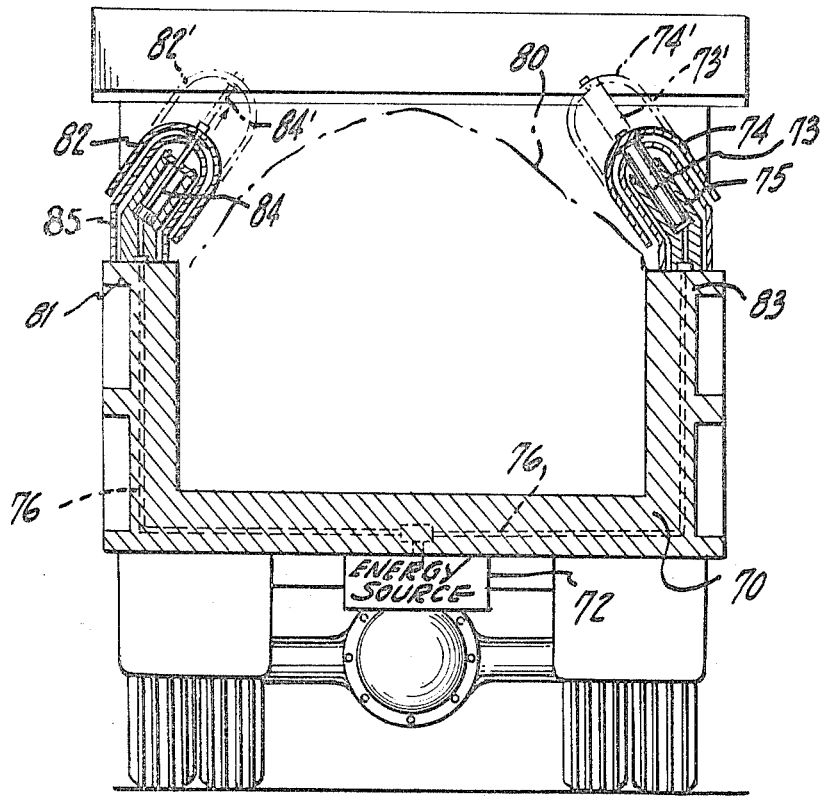
FIG. 4 is a cross-sectional view taken through a boxlike load accommodating assembly of a truck showing cross-sectional views of alternate embodiments of retractable sideboards according to this invention.

Referring to FIG. 1 there is shown an excavator or dump truck 10. The truck 10, has a tail gate 11, which is pivotally mounted on a boxlike load accommodating section 14, by means of hinges 12 or other suitable devices.

The boxlike section 14 is sometimes referred to as the truck body, thereby defining the truck type. Such boxlike section bodies 14 are also referred to as dump or excavator bodies can be separately purchased and mounted upon a vehicle assembly, comprising wheels 18, a cab 20 and suitable drive mechanisms not shown.

In order to handle the heavy loads usually transported by such vehicles 10, the sides 22 are usually reinforced by vertical and horizontal braces 24. Such braces may be sections of steel I-beams or other suitable heavy structural members and serve to give support and rigidity to the boxlike load accommodating section 14. The section 14 is movable with respect to the cab section 20, and can by means of pneumatically or hydraulically operated hoists be rotated about a pivot to dump or discharge a load confined within the cubic carrying capacity of the box structure or body 14.

To discharge such a load the tailgate 11 is opened and a hoist actuating mechanism, not shown, is engaged to pivot the boxlike structure 14 and thus discharge the load through the opening.

The cubic capacity of the box structure 14 is very important and great care and effort is taken in the design of such bodies to add to the cubic capacity and, in general, to increase the legal payload.

Such vehicles 10 because of the heavy bulk cargos they must carry, are very large as compared to a conventional automobile. Typical distances, 30, from the ground to the top of the vehicle 10, in excess of 10 or more feet are not unusual.

Because of the nature of the bulk cargo, as gravel, rock, sand, etc., such vehicles as 10 are usually top loaded. In this manner the tailgate 11 is usually closed during loading and the cargo is loaded by means of a steam shovel or other device. Many such vehicles are loaded by means of a hopper as 32 shown in FIG. 1.

To accomplish top loading via a hopper 32, the vehicle is located underneath the hopper 32 with the geometrical center of the boxlike load accommodating section 14 approximately directly under the hopper 32. The hopper 32 as operated, then places a known quantity of material 16 into the box structure 14. The outline of the load 16 is shown dashed, and forms a mound because of the relationships of the vehicle 10 to the hopper 32. In any event, steam shovel loading and so on produce similar results, and cause the load 16 to protrude above the sides 22 of the vehicle 10. In order to comply with regulations the operator of such a vehicle 10 would have to climb up the side 22 of the truck 10, using either the braces 24 to gain foothold, a ladder or other device. Due to the height 30 of the vehicle 10 from the ground, this can be very dangerous. Once the top of the sides are reached one has to enter the box structure 14 and redistribute the load 16. If the load 16 is rock or sand it can slide and thereby injure the operator or worker. If the load 16 is precariously balanced, a tarpaulin or other covering might be placed over the top opening to restrain the load. However, in order to secure such a cover, one has to again climb the side 22 of the truck 10 and again subject himself to the possibility of severe injury.

There is shown retractable sideboards 34 comprising an inner member 36 and a cover or outer member 38. The inner member 36 is fabricated from steel, aluminum, or some other suitable material and has a width approximately equal to the width 40 of the sides 22. The member 36 is rigidly secured to the top of the sides 22 of the truck, by means of suitable bolts, rivets or by welding. The inner member 36 has hollow areas therein, dispersed at intervals along the length, for accommodating hydraulically or pneumatically activated piston assemblies 42 and 44. As shown in FIG. 1, the length of inner member 36 is approximately equal to the predominant length of the sides 22.

Such bodies 14 are typically fabricated with front and backwalls higher then the sidewalls to provide structural rigidity and extra support. In this manner the predominant height of the sides 22 is lower then the front or back walls. (See FIG. 1) For examples of such body construction see a form bulletin, entitled "Perfection Excavator-Type Heavy Duty Body Models 254CX, and 354CX," by Perfection Steel Body Co., Galton, Ohio, Form PHB-136. Other similar type body constructions are available and known as well.

In this manner, as shown, the inner member 36 is of a length equal to the length of the side 22 defined between the outer most edge of the support 20 from the front wall and that edge from support 23 of the backwall.

Above the piston assemblies 42 and 44 there are openings 56 and 58 on the top surface of the inner member 36, to allow the pistons associated with the assemblies 42 and 44 to move in a vertical direction, relatively longitudinal with respect to the length of the sides 22.

Slideably mounted and forming a cover about the secured inner member 36 is an outer member 38. Member 38 may be guided by means of suitable track assemblies 45 and 46 to enable vertical movement.

The piston assemblies 42 and 44 obtain a source of energy from the pneumatic or hydraulic system 48 present in a vehicle 10, as necessary for activating the brakes 47 of the vehicle 10, or for activating the assembly 14 pivoting hoist mechanism (not shown).

In this manner suitable tubing or conductors 50 (dashed lines) are routed from a tap in the pneumatic or hydraulic supply 48 to each of the piston assemblies 42 and 44.

Also shown coupled to the energy supply or source 48 is a switch controlled valve unit 52, which, as will be explained, functions to selectively couple pressurized air or fluid to the piston assemblies 42 and 44. This action causes the pistons therein to move in the vertical direction and therefore lift the slideable outer member 38 to effectively increase the height of the sides 22 of the vehicle 10.

The effective increase of height, for example, is generally indicated by the dashed line 54 approximately showing where the member corresponding to 38 would move upon activation of the piston assemblies associated with the other side corresponding to 22.

The operation of the retractable sideboards in a typical situation would be as follows. The vehicle 10 would locate under the hopper 32, and the bulk cargo 16 deposited within the boxlike load accommodating assembly 14, as shown in FIG. 1. The sideboards 34 during loading would be in the retracted position until the cargo is deposited. In this manner the load accommodating area 14, is filled to legal capacity. When the final load 16 is deposited the operator, safely in the cab 20, or from another remote location, activates the valve control 52 allowing the pneumatic or hydraulic source 48 via conductors 50 to activate and energize the pistons 42 and 44; thus raising the member 38 upwards. This action effectively increases the height increase of the truck sides and in this manner serves as an additional restraining enclosure for the load 16. The effective height increase is sufficient to accommodate and restrain the typical loads transported by such vehicles 10 without a manual redistribution. The retractable sideboards 34 constraining the load avoid the necessity of having the operator or others climb the truck sides 22 for covering or redistribution of the bulk cargo load 16. The sideboards 34 further permit scooping devices to approach the truck closely as there are no protruding obstacles due to the location of the sideboards 34. The mechanical formation of the sideboards 34 permit normal loading as would be accomplished in a vehicle without such sideboards. Accordingly no extra care has to be taken in loading a vehicle 10 with the retractable sideboards 34 of this invention.

The effective increase in height afforded by the sideboards 34 is determined by the legal load capacity of the particular excavator body or boxlike structure 14 and is also selected, considering the typical characteristics of mounds or load configurations formed by top loading devices. Effective height increases of 6 inches to about 2 feet are sufficient for most such bodies 14 in view of the above factors.

FIG. 2 shows a broken partial sectional view of first and second members 36 and 38 together with piston assembly as 42. Similar reference numerals have been retained in describing similar functioning components.

The inner member or section 36 is secured to the top surface of the truck sides 22 by means of bolts, rivets or other devices through a suitable tab or collar as 70. In a known manner member 36 may also be welded to the top surfaces and so on. The second outer or cover member 38 fits about the surface of member 36 and is slideably mounted thereon and with respect thereto. Inner member 36 has an internal cavity 71 which contains or accommodates a piston assembly 42 fixedly secured to the inner member 36 or to the top of the side 22. The piston assembly contains a suitable cylinder 61, made of steel, brass or so on, for accommodating a piston 60.

The piston 60 is fastened to the outer member 38 by means of screws or bolts 65. To permit movement of piston 60, the inner member 36 has a hole 58 on the top surface thereof.

The cylinder member 61 has a piston accommodating cavity 67 therein, for controlling and directing piston 60 and has flange 62 on one end to restrict the vertical movement of the piston 60.

The pneumatic or hydraulic source 48 is coupled to the cylindrical cavity 67 by means of an air or hydraulic fluid hose assembly 50. A valve 63 is operated from a valve control 52 to allow pressurized air or fluid to enter the cylindrical cavity 67. Such a valve 63 may be a solenoid, a pressure valve, as fluid or air actuated, and functions to selectively block the pressurized air or fluid from source 48 from entering or leaving the cylindrical cavity 67.

FIG. 3A shows the cross-sectional view taken at line 3-3 of FIG. 2. The valve stem or plug 64' is opened by the operation of a suitable switch contained within the valve actuator 64. In this manner the actuator 64 may be coupled to the truck's ignition system and hence will operate when the ignition switch is activated. Hence after loading the operator by activating the ignition switch of the truck will operate valve 63' and allow, for example, pressurized air to enter the cylindrical cavity 67 via the hose 50. The pressurized air forces against the piston 60 backwall and thus raises the piston member 60 and therefore plate 38 with respect to the top of the side 22 of the truck. When the piston flanged surface contacts the flanges 62 of the cylinder 61, motion is stopped. By means of a separate switch or a timing mechanism, valve 63' is closed, preventing the pressurized fluid or air from further entering the cavity 67 and also preventing the same from leaving. This action maintains the pressure within the cavity, and therefore the raised position of the member 38.

FIG. 4 shows a cross-sectional view taken thru a dump truck, having alternate embodiment sideboards according to this invention.

The left retractable sideboard has an inner member 85 secured to the top 81 of the left side of the vehicle. The inner member 85 is of an angled or a curved side configuration instead of, substantially vertical. The outer or cover member 82 is again slideably mounted thereon and has the same side profile. The piston 84 is slideably mounted in the cylindrical cavity within the housing in the inner member 85. When pressurized air or fluid is permitted to enter into the cylindrical cavity associated with piston 84, from source 72 by activation of a suitable valve, the piston 84 moves the top cover 82 into the dashed line position 82'. FIG. 3 shows the corresponding protection of bulk load 80. The top of the right side of the truck 83 has mounted thereon an alternate embodiment, containing a wider piston 73 and outer cover member 74, a rigidly secured inner member 75 fastened to the right top side 83 of the truck.

Activation of a suitable valve causes the top assembly cover 74, to move under the action of piston 73 to the dashed line position 74'.

Figure 5:
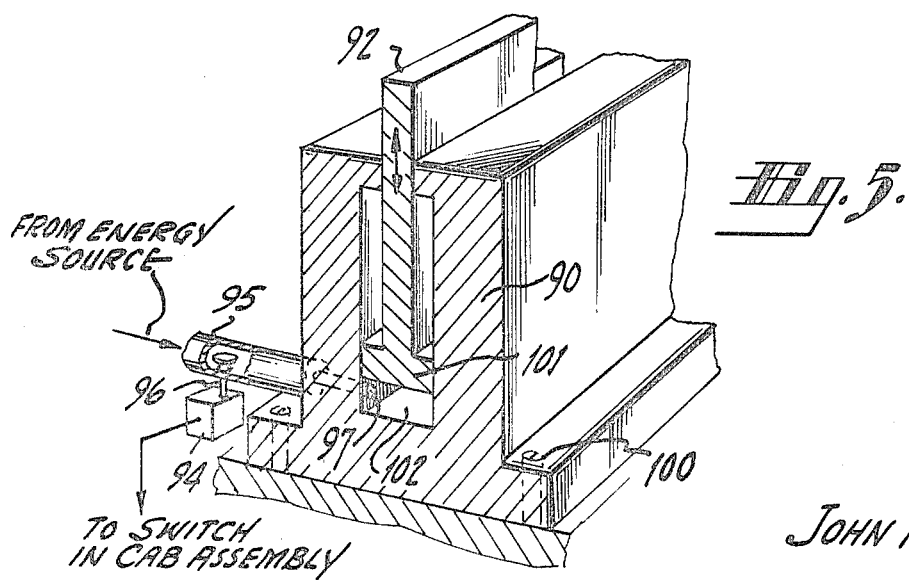
FIG. 5 is a cross-sectional, side, perspective view of a further embodiment according to this invention.

FIG. 5 shows still another embodiment. A first member 90 has a cavity 98 therein shown in the cross-sectional view. The second member 98 functions dually as a retractable sideboard and a piston. Member 98 has a flanged end 101 integral with and located within cavity 102. A passageway 97 couples the cavity 102 to a fluid accommodating hose assembly 95. A valve arrangement 96 can move in a direction to block or allow pressurized fluid to enter the cavity 102. The stem 96 controlled by a valve assembly 94 which may be pressure, electrically or otherwise operated from a switch, or other well-known device. Such a switch is preferably, mounted within the cab assembly of the vehicle. The switch may be operated with the vehicle's ignition system or independently actuated.

Member 90 is secured to the top of the sides of the vehicle 99 by means of bolts inserted through holes 100. When the valve plug 96 is in a position to allow fluid to enter cavity 102, the member 92, is raised vertically as shown by the arrow direction. This again effectively increases the height of the vehicle sides and hence serves to protect the load and operate as previously explained.

In summation, the retractable sideboards according to this invention serve to protect both the public and operator without decreasing the effective payload of the vehicle.

The configurations shown, are adaptable to cooperate with most existing excavator bodies and can be fabricated as an integral part of such bodies, or as easily attachable accessory units for use therewith.

The source of piston activation can be a separate unit but more conveniently by tapped from an existing pressure, hydraulic or other supply furnished with the vehicle frame assembly. It can be seen by one skilled in the art that the pistons can be electrically controlled and actuated by means of switchable gear arrangements driven by motors and hence be operated from a battery associated with such a vehicle.

Accordingly, it should be understood that the embodiments and practices described and portrayed herein, have been presented by way of disclosure, rather than limitation, and that various modifications, substitutions and combinations may be effected without departure from the spirit and scope of this invention in its broader aspects.

I claim:

1. In combination with a truck body having a boxlike load accommodating assembly, having a front and a backwall and two sidewalls of a given height with respect to a reference point comprising therewith:
    a. a first member of a length substantially equal to the length of one of said sidewalls, said member rigidly secured near the top surface of said sidewall, and having an internal cavity contiguous with an opening in a top surface of said first member;
    b. a second member of a length substantially equal to said length of said first member and dimensioned to cover said first member, said second member being slideably mounted with respect to said first member while covering said first member,
    c. a cylinder having a piston accommodating recess contiguous with a first opening in a surface thereof, said cylinder being rigidly fixed with respect to said first member and located within said cavity, said cylinder having a second opening contiguous with said recess and a second surface of said cylinder;
    d. a piston slideably mounted and positioned in said cylinder recess for sliding within said recess and through and protruding from said first opening;
    e. first means including a selectively operated valve coupled to said second opening of said cylinder and adapted to accommodate a source of pressurized fluid, said valve having a first position for allowing pressurized fluid to enter said opening and preventing the entrance of said fluid in a second position; and
    f. means coupled to said valve for selectively operating the same in said first or second positions, for forcing said piston to slide through said first opening and said opening in said first member to coact with and slide said second member with respect to said first member, whereby the resultant movement and position of said second member effectively increases the height of said truck sidewall with respect to said reference point.

2. In combination with a truck body having a boxlike load accommodating assembly, having a front and a backwall and two sidewalls of a given height with respect to a reference point comprising therewith:
    a. a first member of a length substantially equal to the length of one of said sidewalls, said member rigidly secured near the top surface of said sidewall, and having an internal cavity contiguous with an opening in a top surface of said first member;
    b. a cylinder having a piston accommodating recess contiguous with a first opening in a surface thereof, said cylinder being rigidly fixed with respect to said first member, said cylinder having a second opening contiguous with said recess and a second surface of said cylinder;

c. a cylindrical housing having a piston accommodating recess contiguous with a first opening in a surface thereof, said housing being rigidly fixed with respect to said first member, said housing having a second smaller opening contiguous with said recess and a second different surface of said housing;

d. a piston slideably mounted and positioned in said recess for sliding within said recess through said first opening;

e. a source of pressurized fluid coupled to said smaller opening;

f. a selectively operated valve coupled between said source and said smaller opening, for allowing said fluid to enter said opening in a first position, and preventing said entrance in a second position; and g. means coupled to said valve for selectively operating said valve in said first or second positions, whereby when said valve is operated in said first position said piston slides through said first opening and said opening in said first member and coacts with and raises said second member in a relatively vertical direction, whereby said resultant movement and position of said second member effectively increases the height of said truck sidewall with respect to said reference point.

3. The combination according to claim 1 wherein said first and second members are fabricated from steel.

4. The combination according to claim 2 wherein said means coupled to said valve for selectively operating said valve comprise a switch coupled to the ignition switch of said truck whereby said valve operates in said first position wen said ignition switch is operated and in said second position when said ignition switch is turned off.

5. The combination according to claim 2 wherein said source of pressurized fluid is a pressurized air source.

6. In combination:

a. a load accommodating assembly, having a backwall, a front wall, first and second sidewalls, and a bottom wall all contiguous to form a boxlike container having an opening;

b. a first member of a length substantially equal to the length of one of said sidewalls and fixedly mounted on the top of said sidewall near said opening, said member having at least one internal cavity contiguous with an opening on a top surface thereof;

c. force exerting means, including a moveable piston; mounted in said cavity and positioned to permit said piston to move through said opening in said top surface of said first member;

d. a second member of a length substantially equal to the length of said first member and having a U-shaped cross section positioned over said first member and slideably mounted with respect to said fist member and having at least a section thereof covering said opening; and e. selectively operated pressure means coupled to said force exerting means for moving said piston through said opening to coact with said surface of said second member to slide said second member in a relatively vertical direction with respect to said sidewall, in accordance with the movement of said piston.

7. A retractable sideboard assembly for dump trucks or the like having a boxlike load accommodating assembly including two sidewalls, a bottom wall, a front and backwall and an open top, comprising:

a. a first housing having an internal cavity and having one surface adapted for mounting on a sidewall of said load accommodating assembly near said open top, said housing having an aperture therein communicating with said internal cavity and located on a surface of said housing furthest removed from said open top;

b. a second member of a length substantially equal to the length of said sidewall said second member having a relatively U-shaped cross section and dimensioned to cover and be slideable with respect to said first housing;

c. a cylinder including a piston member, said cylinder rigidly positioned within said internal cavity of said first housing, said piston member slideably mounted with respect to said cylinder and said first housing to slide through said opening when said piston is activated;

d. means including a selectively activated valve coupled to said cylinder and adapted to accommodate a source of pressurized fluid to permit said fluid to enter said cylinder to slide said piston through said opening in a first position and to block the entrance of fluid in a second position, whereby said piston in said first position coacts with and raises said second member with respect to said sidewall after a load is accommodated by said truck; and e. selection means coupled to said valve for operating the same in either of said first and second positions.

8. The retractable sideboard assembly according to claim 7 wherein said means coupled to said cylinder is adapted to accommodate a source of pressurized gas.